United States Patent [19]
Suskind

[11] Patent Number: 5,458,933
[45] Date of Patent: Oct. 17, 1995

[54] COMPOSTABLE PACKAGING FOR CONTAINMENT OF LIQUIDS

[75] Inventor: Stuart P. Suskind, Wayne, Pa.

[73] Assignee: Leonard Pearlstein, Gladwyne, Pa.

[21] Appl. No.: 154,456

[22] Filed: Dec. 17, 1993

Related U.S. Application Data

[62] Division of Ser. No. 962,100, Oct. 16, 1992, abandoned.

[51] Int. Cl.$^6$ .................................................. B65D 71/00
[52] U.S. Cl. ..................... 428/34.2; 428/34.6; 428/35.7; 428/514; 428/513; 428/481; 206/812
[58] Field of Search ................... 428/34.2, 34.3, 428/481, 513, 514, 35.7; 206/233, 494, 812, 209, 524.2

[56] References Cited

U.S. PATENT DOCUMENTS

| | | | |
|---|---|---|---|
| Re. 33,376 | 10/1990 | Gibbons et al. | 428/34.2 |
| D. 269,329 | 6/1983 | Malamoud | D10/18 |
| 967,688 | 8/1910 | Titherley | 424/443 |
| 1,466,888 | 9/1923 | Morrissey | 15/208 |
| 1,786,513 | 12/1930 | Zuckerman | 252/91 |
| 2,109,749 | 3/1938 | McColl | 15/104.93 |
| 2,187,163 | 1/1940 | Langer | 15/104.93 |
| 2,367,520 | 1/1945 | Patek | 229/3.1 |
| 2,840,080 | 6/1958 | Clark | 604/289 |
| 2,999,265 | 9/1961 | Duane et al. | 424/443 |
| 3,057,467 | 10/1962 | Williams | 206/361 |
| 3,129,867 | 4/1964 | Schroeder | 220/462 |
| 3,150,049 | 9/1964 | Emory | 424/447 |
| 3,206,907 | 9/1965 | Schroeder | 53/449 |
| 3,234,858 | 2/1966 | Rein et al. | 493/60 |
| 3,240,326 | 3/1966 | Miller | 206/361 |
| 3,263,891 | 8/1966 | Brugh, Jr. | 224/3.1 |
| 3,264,188 | 8/1966 | Gresham | 428/485 |
| 3,305,383 | 2/1967 | Gordy | 427/416 |
| 3,414,927 | 12/1968 | Worcester | 15/104.93 |
| 3,485,349 | 12/1969 | Chaney . | |
| 3,495,507 | 2/1970 | Haas et al. | 493/287 |
| 3,499,575 | 3/1970 | Rockefeller . | |
| 3,533,533 | 10/1970 | Chaney, Jr. | 221/25 |
| 3,561,994 | 2/1971 | Dwyre | 427/212 |
| 3,604,613 | 9/1971 | Haas et al. | 229/190 |

(List continued on next page.)

FOREIGN PATENT DOCUMENTS

| | | |
|---|---|---|
| 0194097 | 9/1986 | European Pat. Off. . |
| 0197485 | 10/1986 | European Pat. Off. . |
| 0240009 | 10/1987 | European Pat. Off. . |
| 0370192 | 5/1990 | European Pat. Off. . |
| 0397510 | 11/1990 | European Pat. Off. . |
| 0459110 | 12/1991 | European Pat. Off. . |
| 0534471 | 3/1993 | European Pat. Off. . |
| 0542142A1 | 5/1993 | European Pat. Off. . |
| 976091 | 3/1951 | France . |
| 2302925 | 10/1976 | France . |
| 460625 | 7/1968 | Switzerland . |
| 928610 | 6/1963 | United Kingdom . |
| 1454599 | 11/1976 | United Kingdom . |
| WO91/13207 | 9/1991 | WIPO . |
| WO93/02947 | 2/1993 | WIPO . |

OTHER PUBLICATIONS

Abstract (J04298345) for "Paper Container Which Degrades In Environment," Oct. 22, 1992.

E. W. Veazey, "The Potential of LLDPE In Coextruded Film," First Annual Paper, Film and Foil Converter, Feb. 1982, pp. 41–46.

Abstract (J04062054) for "Decomposable Laminated Sheet Preparation For Packaging Foods, Etc." Feb. 27, 1992.

International Search Report, dated 10 Jan. 1994 mailed 18 Jan. 1994.

Primary Examiner—James J. Seidleck
Assistant Examiner—Michael A. Williamson
Attorney, Agent, or Firm—Finnegan, Henderson, Farabow, Garrett & Dunner

[57] ABSTRACT

A compostable paperboard container and package for liquids which is coated with a material capable of degrading to carbon dioxide, water and biomass under composting conditions.

22 Claims, 9 Drawing Sheets

U.S. PATENT DOCUMENTS

| | | | |
|---|---|---|---|
| 3,624,224 | 11/1971 | Watchung et al. | 424/443 |
| 3,657,760 | 4/1972 | Kudisch | 15/104.93 |
| 3,659,772 | 5/1972 | Dorsey et al. | 229/3.1 |
| 3,754,642 | 8/1973 | Stidolph | 206/45.14 |
| 3,784,055 | 1/1974 | Anderson | 221/46 |
| 3,784,056 | 1/1974 | Spruyt et al. | 221/63 |
| 3,794,698 | 2/1974 | Diaz et al. | 524/585 |
| 3,841,466 | 10/1974 | Hoffman et al. | 206/205 |
| 3,850,863 | 11/1974 | Clendinning et al. | 523/128 |
| 3,881,210 | 5/1975 | Drach et al. | 15/104.93 |
| 3,904,074 | 9/1975 | Hoffman et al. | 220/339 |
| 3,953,169 | 4/1976 | Igarashi et al. | 8/192 |
| 3,958,056 | 5/1976 | Brught, Jr. et al. | 428/215 |
| 3,965,518 | 6/1976 | Muoio | 15/104.93 |
| 3,965,519 | 6/1976 | Hermann | 15/104.93 |
| 3,972,467 | 8/1976 | Whillock et al. | 220/339 |
| 4,000,816 | 1/1977 | Spruyt | 220/339 |
| 4,026,458 | 5/1977 | Morris et al. | 229/3.1 |
| 4,112,167 | 9/1978 | Dake et al. | 428/154 |
| 4,131,195 | 12/1978 | Worrell, Sr. | 206/205 |
| 4,147,836 | 4/1979 | Middleton et al. | 428/481 |
| 4,220,244 | 9/1980 | Elmore | 206/210 |
| 4,237,190 | 12/1980 | McGee | 428/513 |
| 4,245,744 | 1/1981 | Daniels et al. | 206/210 |
| 4,309,469 | 1/1982 | Varona | 428/74 |
| 4,332,319 | 6/1982 | Hurwood | 206/210 |
| 4,339,507 | 7/1982 | Kurtz et al. | 428/522 |
| 4,362,781 | 12/1982 | Anderson | 428/291 |
| 4,381,246 | 4/1983 | Anderson | 252/91 |
| 4,427,111 | 1/1984 | Laipply | 206/210 |
| 4,435,344 | 3/1984 | Iioka | 264/45.1 |
| 4,437,567 | 3/1984 | Jeng | 206/210 |
| 4,448,704 | 5/1984 | Barby et al. | 252/91 |
| 4,452,846 | 6/1984 | Akao | 428/220 |
| 4,513,036 | 4/1985 | Thompson | 428/34.2 |
| 4,525,396 | 6/1985 | Takasa et al. | 428/34.2 |
| 4,537,807 | 8/1985 | Chan et al. | 428/74 |
| 4,559,157 | 12/1985 | Smith et al. | 252/90 |
| 4,576,865 | 3/1986 | Akao | 428/335 |
| 4,590,126 | 5/1986 | Andersson | 428/346 |
| 4,660,737 | 4/1987 | Green et al. | 220/410 |
| 4,666,621 | 5/1987 | Clark et al. | 428/227 |
| 4,678,698 | 7/1987 | Mencke | 206/812 |
| 4,696,393 | 9/1987 | Laipply | 206/210 |
| 4,698,246 | 10/1987 | Gibbons et al. | 428/34.2 |
| 4,701,360 | 10/1987 | Gibbons et al. | 428/34.2 |
| 4,732,797 | 3/1988 | Johnson et al. | 428/74 |
| 4,739,879 | 4/1988 | Nakamura | 206/205 |
| 4,741,944 | 5/1988 | Jackson et al. | 428/152 |
| 4,772,501 | 9/1988 | Johnson et al. | 428/288 |
| 4,778,699 | 10/1988 | Knox, III et al. | 428/35.2 |
| 4,789,575 | 12/1988 | Gibbons et al. | 428/34.2 |
| 4,795,665 | 1/1989 | Lancaster et al. | 428/34.2 |
| 4,796,751 | 1/1989 | Madkour | 206/223 |
| 4,806,398 | 2/1989 | Martin, Jr. | 428/34.2 |
| 4,806,399 | 2/1989 | Gibbons et al. | 428/34.2 |
| 4,817,790 | 4/1989 | Porat et al. | 206/205 |
| 4,828,912 | 5/1989 | Hossain et al. | 530/361 |
| 4,880,696 | 11/1989 | Yanidis | 428/349 |
| 4,882,221 | 11/1989 | Bogart et al. | 428/308.8 |
| 4,948,640 | 8/1990 | Gibbons et al. | 428/34.9 |
| 4,950,510 | 8/1990 | Massouda | 428/34.2 |
| 4,988,546 | 1/1991 | Tanner et al. | 428/34.2 |
| 4,998,984 | 3/1991 | McClendon | 206/205 |
| 5,049,440 | 9/1991 | Bornhoeft, III et al. | 428/288 |
| 5,059,459 | 10/1991 | Huffman | 428/34.2 |
| 5,064,699 | 11/1991 | Havens et al. | 428/35.7 |
| 5,213,858 | 5/1993 | Tanner et al. | 428/34.2 |
| 5,286,538 | 2/1994 | Pearlstein et al. | 428/34.2 |

AEROBIC BIODEGRADATION OF POLYCAPROLACTONE (ASTM D5209)

| INOCULUM EXPOSURE (DAYS) | CUMULATIVE CARBON DIOXIDE (mg) |
|---|---|
| 0 | 0 |
| 5 | 22.2 |
| 19 | 145.1 |
| 32 | 299.8 |
| 42 | 406.8 |
| 50 | 484.2 |
| 60 | 532.1 |

FIG. 1

AEROBIC BIODEGRADATION OF POLYCAPROLACTONE POLYETHYLENE BLENDS

| | CUMULATIVE CARBON DIOXIDE (mg) | |
|---|---|---|
| INOCULM EXPOSURE (DAYS) | 90% PCL 10% LLDPE | 80% PCL 20% LLDPE |
| 0 | 0 | 0 |
| 5 | 24.6 | 19.8 |
| 19 | 228.9 | 125.8 |
| 32 | 361.0 | 198.4 |
| 42 | 391.8 | 220.4 |
| 50 | 406.3 | 256.3 |
| 60 | 440.5 | 287.8 |

FIG. 6

COMPOSTABLE PACKAGING FOR CONTAINMENT OF LIQUIDS

This is a division of application Ser. No. 07/962,100, filed Oct. 16, 1992 abandoned.

BACKGROUND OF THE INVENTION

1. Field of the Invention

The present invention relates to a compostable container for containing liquids or liquid containing materials. The present invention furthers relates to a paperboard container having a degradable coating on at least one of the internal or external surfaces thereof. More particularly, the present invention relates to a paperboard container which will biodegrade to carbon dioxide, water and biomass under composting conditions. The present invention further relates to a method of making and a method of using the degradable container.

2. Discussion of the Prior Art

In the management of Municipal Solid Waste (MSW), the expectation that paper and paper products would biodegrade in landfills has proven to be unreliable. In fact, newspapers buried for over fifty year have been recovered from landfills in readable condition. Since paper comprises about 50 % of landfill space, it has become an important priority to find alternate ways to manage paper waste.

Recycling paper, often with the removal of printing inks and coatings, has proven to be economically feasible when the recovered pulp fibers find new markets and applications. Fiber recovery, and, in particular, repeated fiber recoveries tend to damage, break, and otherwise reduce the quality of paper fiber. This degradation in paper quality often results in a product with limited or nonexistent new markets or applications.

Since paper has the inherent property of biodegradability under appropriate conditions, more attractive alternates to simple landfilling have received increased attention. Among these, is the process of composting, in which waste is degraded to humus or biomass under accelerated and controlled conditions of moisture, air and microorganisms. More specifically, paper, under composting conditions is converted into carbon dioxide, water, and biomass. The biomass is essentially comprised of microorganisms. Thus, the mass of waste is significantly reduced and the humus by-product has commercial value as low grade fertilizer, soil conditioner, and as a mulch for land and agricultural applications.

Paper products are often coated with resins or plastic materials to provide barrier properties when they will be used in the containment of liquids. The most important requirements for these structures when intended for use as folded cartons to contain liquid products include:

a. barrier properties to reduce and prevent absorption and/or transmission of liquid components;

b. heat sealability for carton construction and integrity.

c. printability to provide attractive, non-functional graphics;

d. vapor barriers to contain fragrances, flavors, moisture, etc.;

e. barriers to oxygen and other ambient gases;

f. rigidity, shape retention, and crush resistance.

Typical constructions of important commercial value include milk cartons in which the paperboard coating composition is low density polyethylene; fruit juice containers as described in U.S. Pat. No. Re 33,376; and wet wipe container as described in copending U.S. patent application Ser. Nos. 07/740,141 now abandoned and 07/923,556, now U.S. Pat. No. 5,286,538 all of which are incorporated herein by reference.

Such constructions meet the requirements stated above in (a)–(f), however, such constructions are compostable only to the degree to which cellulose pulp is present, typically around 85% Under composting conditions, the pulp fibers would be expected to decompose leaving a residue of biologically inert plastic.

SUMMARY OF THE INVENTION

It is therefore an object of the invention to overcome these and other difficulties encountered in the prior art.

Given the current waste disposal problems, another object of the present invention is to provide a container for liquids which meets requirements (a)–(f) and which will also degrade to carbon dioxide, water and biomass under composting conditions.

Another object of the present invention is to provide liquid barrier properties to pulp based substrates which are degradable under composting conditions by coating with polymers selected from the group of aliphatic polyesters.

A further object of the invention is to provide, as an environmentally improved alternate to plastic, a completely degradable packaging material for the containment of liquids and wet products.

Still another object of the invention is to provide crush-resistant, durable packaging material suitable for liquids and wet products.

A further object of the invention is to provide coated packaging material for use in folded cartons in which the coating has a composting rate approximately equal to the pulp based substrate.

Another object of the invention is to provide special properties to coatings of biodegradable aliphatic polyesters, by blending to about 30% by weight with polymers or fillers that are either miscible or mechanically compatible.

To achieve the objects and in accordance with the purpose of the invention, as embodied and broadly described herein, the invention comprises a compostable package for containing liquids or wet products including a base of paperboard having coated thereon a polymeric material capable of preventing leaks wherein said base and said polymeric material degrades to form carbon dioxide, water and biomass.

In another aspect of the invention there is provided a method of making a compostable package for containing a liquid or a liquid containing material comprising, providing a base of paperboard, coating said paperboard with a material capable of preventing leaks, wherein said base and said material are compostable to carbon dioxide, water and biomass, forming said paperboard into a container and sealing the edges and bottom of said container.

In still another aspect of the invention there is provided a method of using a compostable package for containing a liquid or a liquid containing material comprising, providing a base of paperboard, coating said paperboard with a material capable of preventing leaks, wherein said base and said material are compostable to carbon dioxide, water and biomass, forming said paperboard into a container, sealing the edges and bottom of said container, and placing into said container a liquid or a material containing a liquid.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

FIG. 1, illustrates the aerobic biodegradation of polycaprolactone using ASTM D5209.

FIG. 6, illustrates the aerobic biodegradation of blends of polycaprolactone and polyethylene.

DESCRIPTION OF THE INVENTION

Figure 2:
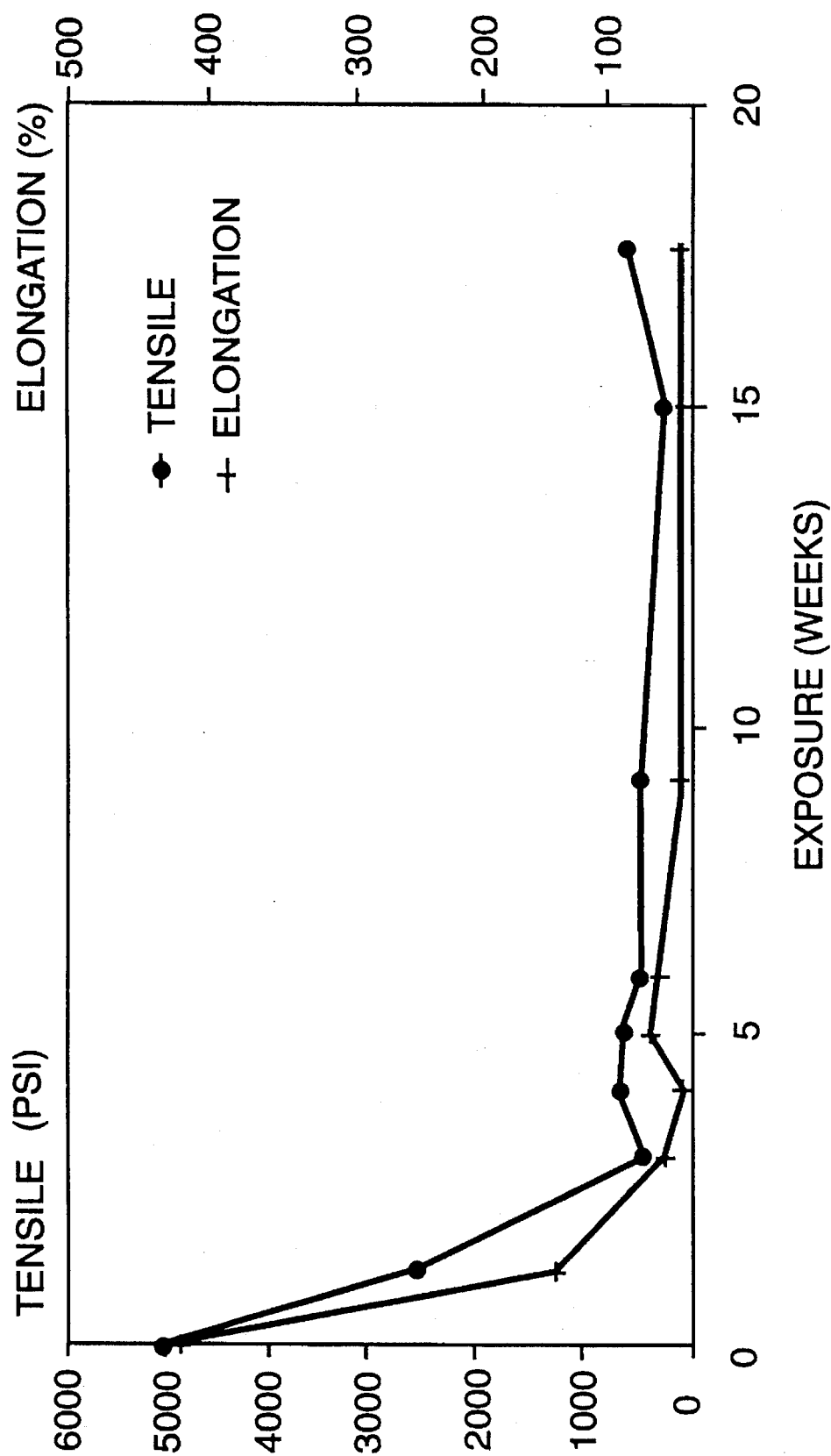
FIG. 2, illustrates the loss of mechanical properties observed for a film of polycaprolactone under outdoor composting conditions.

According to the present invention, a paperboard container is produced for containing liquids or liquid containing materials. The container is formed from paperboard or related paper substrates. For the purposes of this invention, the term paperboard refers to those grades and types of paper made on either cylinder board machines or multiwire, four-drinier type machines as well as multiformers. Fiber stock may be either recycled, or virgin or mixtures thereof, bleached or unbleached. Additional information on paper and paperboard used in packaging applications may be found in James E. Kline, Chapter 10, *Paper and Paperboard*, Miller Freeman Publications, San Francisco, Calif., 1982, which is herein incorporated by reference.

The paperboard or paper substrate for use in the present invention has a basis weight of from about 35 lbs/ream to about 220 lbs/ream and preferably from about 175 lbs/ream to about 220 lbs/ream. According to one embodiment of the present invention, the paper substrate has a thickness from about 4 to 25 mils and more preferably about 10 to 20 mils. The coated paperboard should be selected to produce a container having a cross directional (CD) stiffness as determined by the Taber method of from 50 to 150 and more preferably of from 60 to 135. The Taber method is described in *TAPPI* Test Procedure T-489.

The ratio of cross direction Taber stiffness of the coated paperboard to its basis weight (lb/ream) is at least 0.20 and more preferably at least 0.5.

Paperboard is generally stronger and stiffer in the machine direction (MD) than in the cross direction. According to one embodiment of the present invention the machine direction preferably runs along the container from side to side, i.e. in a direction perpendicular with the top and bottom of the container. The machine direction runs from side to side of the container; the fiber direction of the paperboard from top to bottom of the container is said to be the cross direction (CD). The coated paperboard used in the container according to the present invention preferably has a ratio of Taber stiffness of MD/CD of less than or equal to about 2.65 and more preferably less than or equal to about 1.92.

The paperboard or paper substrate material is coated on at least one side thereof with a degradable resin in a thickness of from about 5.5 to 2.0 mils. In one preferred embodiment, both sides of the paperboard substrate are coated with the degradable resin to a thickness of from about 5.5 to about 2.0 mils. In the present invention degradation includes biodegradation as well as degradation by moisture, light, oxygen and other well known means of breaking down waste materials.

Coating techniques, for example, extrusion coating, impregnation and the like, are well known in the art, and in accordance with the present invention, inner coatings and outer coatings may be applied by processes well known in the art. Furthermore, the design, quality control and fabrication of folded cartons for the containment of liquids are well known in the art, and these processes and techniques may be used in making the containers of the present invention.

Characteristics of the biodegradable coating materials for use in the present invention include good moisture barrier properties, good thermal sealing properties, sufficient stiffness to give the container good crush resistance and biodegradability under composting conditions.

Examples of biodegradable resins include thermoplastic oxyalkanoyl polymers, e.g., ε-caprolactone polymers and those that contain the recurring unit:

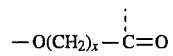

Wherein x is an integer having a value of 2,3 and 5–7, including polymers of beta propriolactone and Δ-valerolactone; polyesters of 3-hydroxybutyric acid, 3-hydroxyvaleric acid and mixtures thereof as well as copolymers of any of the above.

Suitable also are graft polymers prepared by reacting a lactone such as ε-caprolactone with hydroxyl or amino functional resins such as hydrolyzed ethylene-vinyl acetate copolymers; segmented polyurethane prepared by reacting polycaprolactone bearing terminal hydroxyl groups with diisocyanates and, optionally, chain-extending glycols such as 1,4 butanediol.

Included also are aliphatic polyesters such as polyglycolic acid, polylactic acid, polydioxanone, poly(trimethylene carbonate) and their co- and terpolymers as well as blends of any of the above with polyesters prepared from alkanediols and alkanedicarboxylic acids including oxalates.

Preferred biodegradable resins for use in the present invention are polyhydroxyaliphatic acids (PHAA).

Naturally occurring biodegradable substances are useful as fillers offering the advantage of reduced cost. Such fillers include starch, tree bark, ground paper, peat moss and soy bean powder.

Polyhydroxyaliphatic acids in film form are biodegradable under composting conditions. One preferred polyhydroxyaliphatic acid, polycaprolactone (PCL) is available as a biodegradable thermoplastic resin from Union Carbide. It is synthesized from ε-caprolactone:

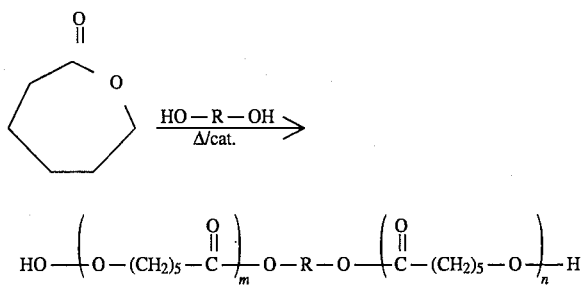

Figure 3:
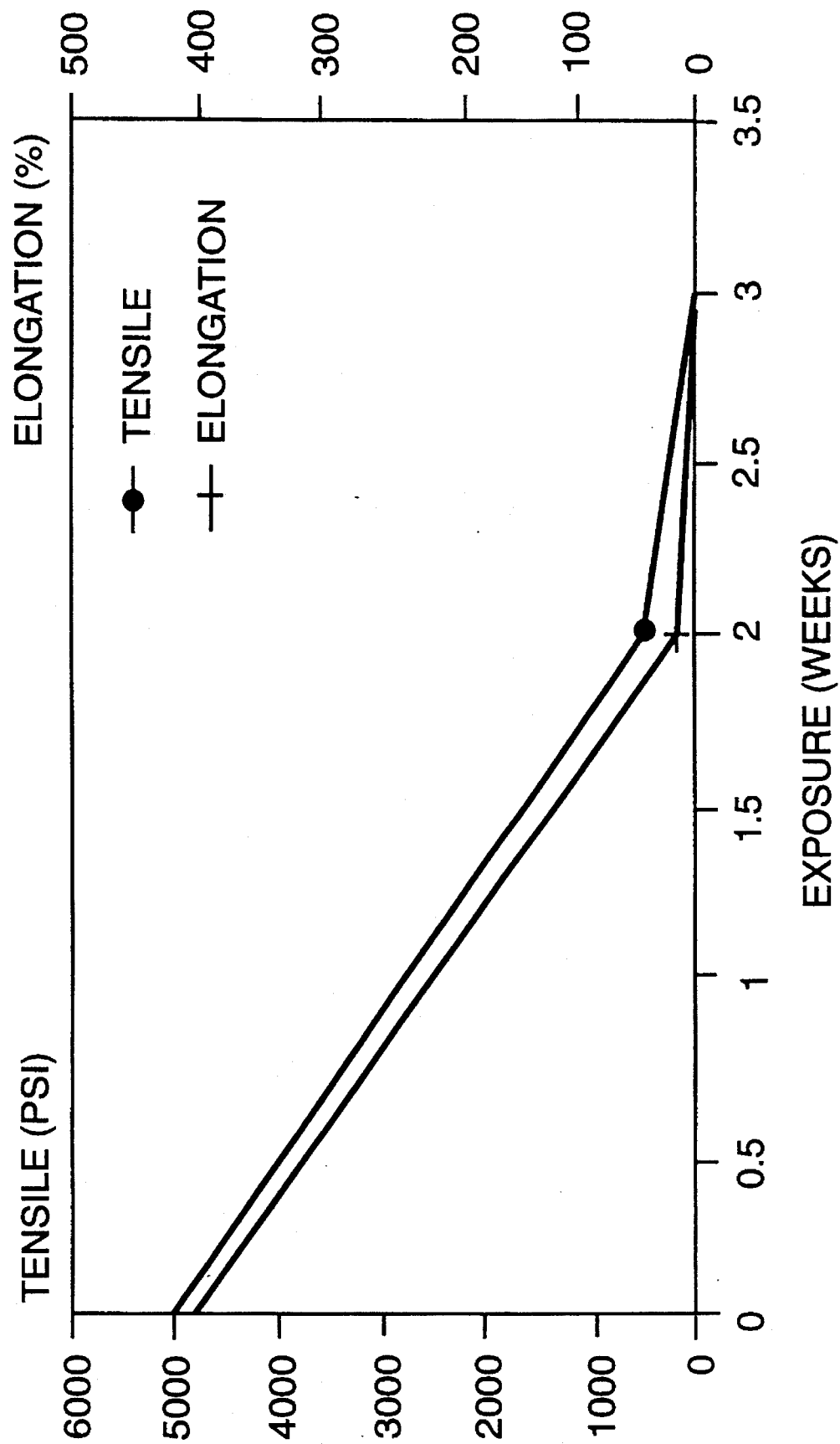
FIG. 3, illustrates the loss of mechanical properties observed for a film of polycaprolactone under indoor composting conditions.
Figure 4:
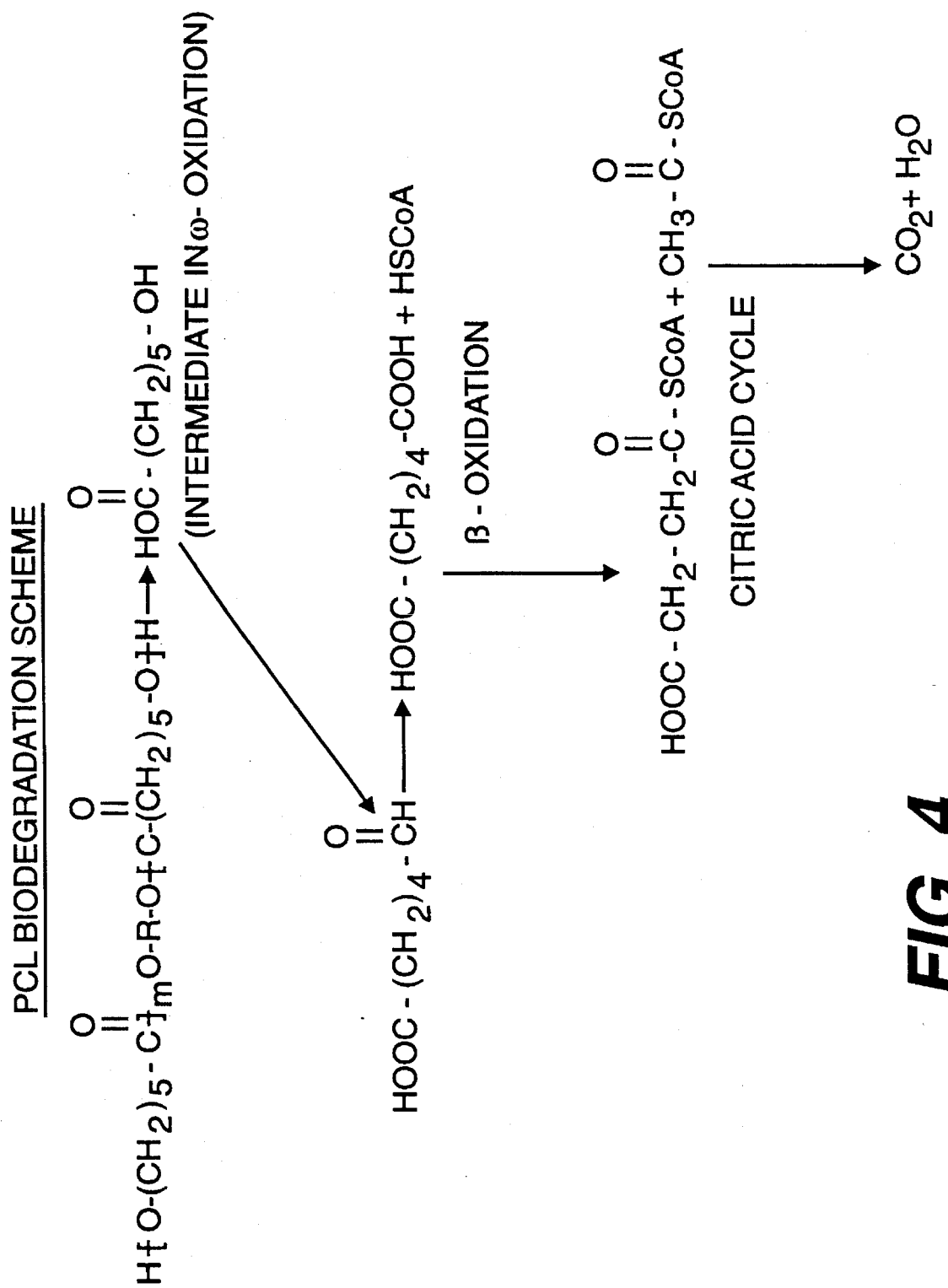
FIG. 4, illustrates the biodegradability mechanism for polycaprolactone.

Polycaprolactone in film form, has been demonstrated to be biodegradable under soil burial and composting conditions, as shown in FIGS. 1–3. Composting of PCL is thought to occur by the mechanism proposed in FIG. 4.

Other preferred polymers for use in the present invention are the commercially available PHBV polymers of ICI which are polyesters of 3-hydroxybutyric (HB) and 3 hydroxyvaleric (HV) acids. Their general structure is:

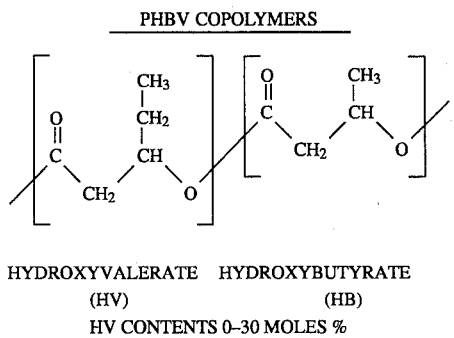

PHBV COPOLYMERS

HYDROXYVALERATE (HV)   HYDROXYBUTYRATE (HB)

HV CONTENTS 0–30 MOLES %

Figure 5:
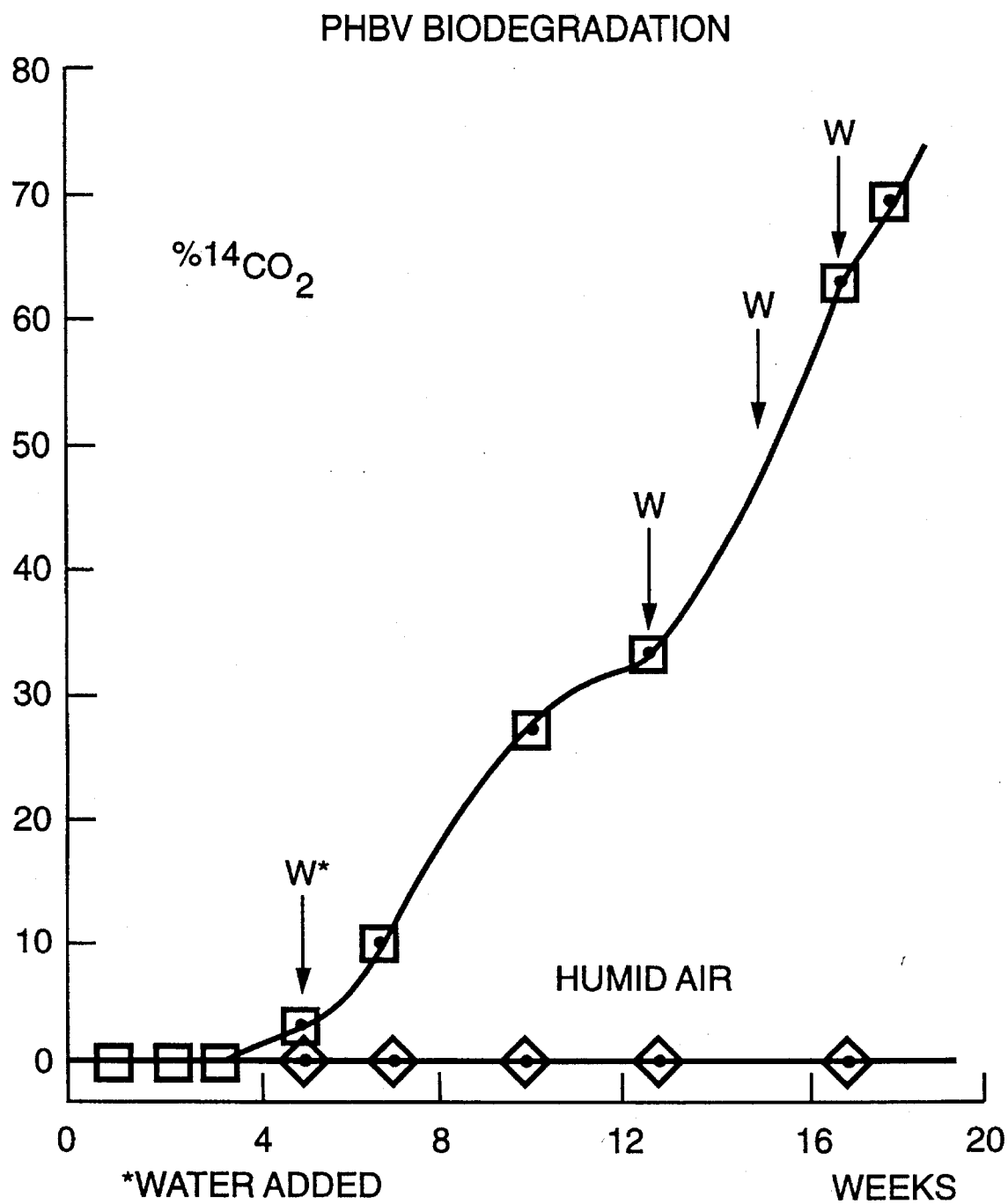
FIG. 5, illustrates the biodegradations of polyesters of 3-hydroxybutyric acid and 3-hydroxyvaleric acid (PHBV).

These polymers are produced by the fermentation of sugar by the bacterium ALCALIGENES EUTROPHUS and will degrade to carbon dioxide and water when placed in the presence of microorganisms found in soil, sewage, and river bottoms as shown in FIG. 5.

while PCL is claimed to undergo aerobic degradation, PHBV will degrade under either aerobic or anaerobic conditions.

To enhance or optimize functional properties and cost it may be desirable to blend these resins with other material. The successful blending of the aliphatic polyester with additives to provide improved properties and reduced cost without impairing degradability was a most useful and surprising aspect of this invention.

Additives and blending resins include those which are either miscible or mechanically compatible with aliphatic polyester. Examples listed below are suitable for use with polycaprolactone:

| Miscible | Mechanically Compatible |
|---|---|
| PVC | Polyethylene |
| SAN | Polypropylene |
| ABS | Natural Rubber |
| Phenoxy | Styrene/Butadiene |
| Polycarbonate | Elastomer & Block Copolymers |
| Nitrocellulose | Polyvinylacetate |
| Poly (Vinylidene Chloride) | Polybutadiene |
| Styrene/Allyl Alcohol Copolymers | Ethylene/Propylene Rubber |

In addition, PCL may be blended with thermoplastic elastomers for improved toughness, adhesive, and flexibility. Especially suitable are the elastomeric segmented polyurethanes prepared from aliphatic polyester diols, aromatic or alicyclic diisocyanates; and, optionally, short chain diol or diamine chain-extender.

Accordingly, the skilled artisan can incorporate the many useful and unique properties of these additives into the coating composites to meet specific requirements of the various end uses contemplated. These materials may be added in from about 0% to about 30%, preferably from about 10 to about 20%. Although these materials alone are either slowly compostable or noncompostable, their use in limited amounts as described above does not impair the ultimate biodegradation of the coating materials.

In addition to blended compositions, these compositions may be coated onto the paperboard substrate in successive layers. Noncompostable or slowly compostable layers are so positioned so as not to interfere with composting of the remainder of the container. As an alternative, individual layers of the same or different blended materials may be used to form the substrate coatings. Noncompostable and slowly compostable materials may be used in blends or as intermediate layers in limited amounts. When used in blends, these materials are preferably contained in less than 30% and when found in film form are preferably less than 0.6 mils in thickness. These materials do not interfere with the compostability and degradation of the container and are found in the humus. After composting, these materials are from a practical standpoint indistinguishable from the rest of the humus.

Figure 7:
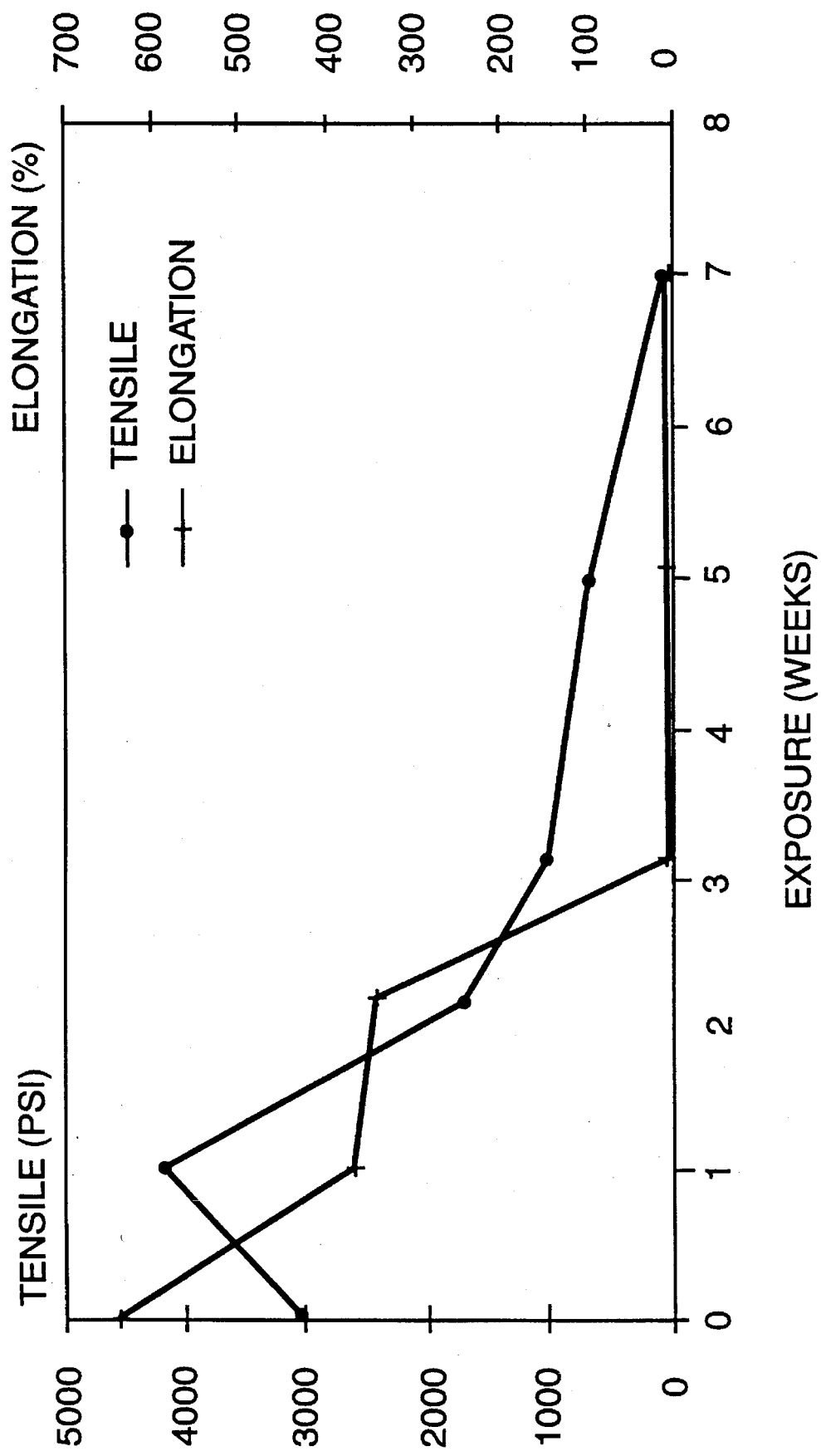
FIG. 7, illustrates the loss of mechanical properties observed for a film of polycaprolactone-polyethylene blends under outdoor composting conditions.
Figure 8:
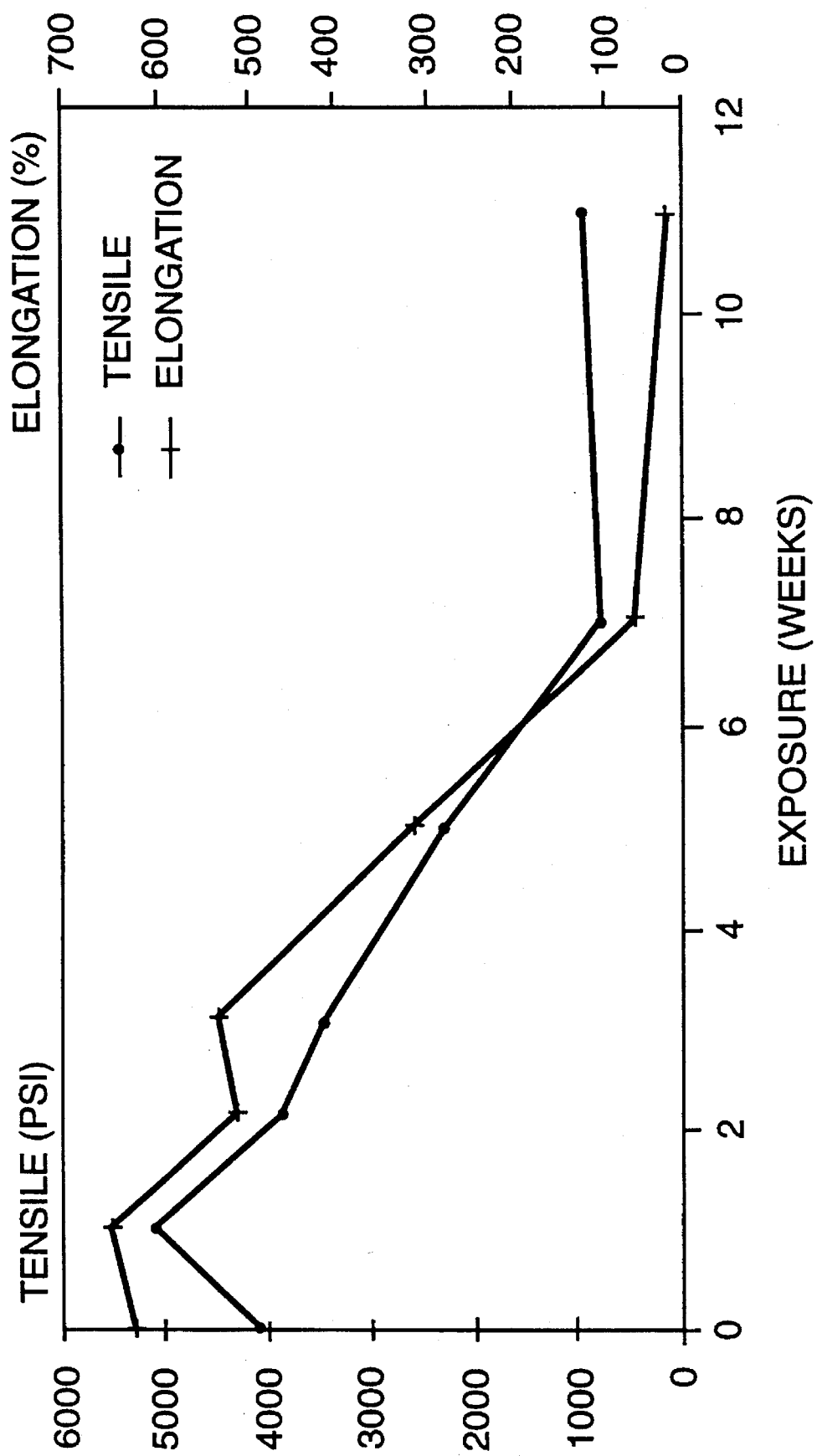
FIG. 8, illustrates the loss of mechanical properties observed for a film of polycaprolactone-polyethylene blends under indoor composting conditions.

In one preferred embodiment, the coating is comprised of either 100% aliphatic polyester or mixtures thereof with polyethylene in which the polyethylene is present at levels up to about 30%. The addition of polyethylene reduces the rate of water vapor transmission which is advantageous for certain long shelf-life products. With the addition of as much as 30% polyethylene to aliphatic polyester, composting is slower, but nevertheless effective under typical composting conditions, as shown in FIGS. 6–8.

As an alternative or in addition to the materials described above, starch may be added to the coating materials according to the present invention. Starch may be added in from about 0% to about 70% and more preferably from about 40 to about 60%. One commercially available starch based biodegradable material for use in the present invention is Mater-Bi® produced by Novamont. This product contains up to 60% starch and 40% of a biodegradable resin material.

Since both coatings and pulp-based substrate are degradable, disposable packages from these composites will decompose completely thus contributing to alternate waste treatment of paper based products. In addition to being completely degradable, the containers according to the present invention may be incinerated.

FIGS. 9, 10, 11, and 12 show several embodiments of the coated paperboard used in the production of the container according to the present invention.

Figure 9:
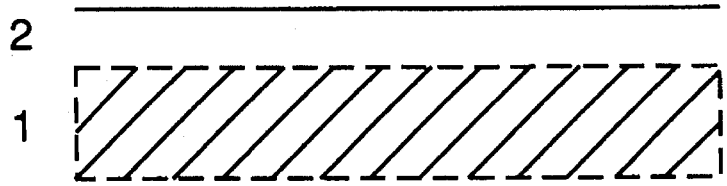
FIGS. 9–12, illustrate cross-sectional views of the structure of the container materials according to the present invention.

In FIG. 9, layer 1 is a flexible, strong paper substrate. Layer 2 is an interior or exterior coating of 80–100% of a biodegradable resin having a thickness of from about 5.5 to about 2.0 mil.

Figure 10:
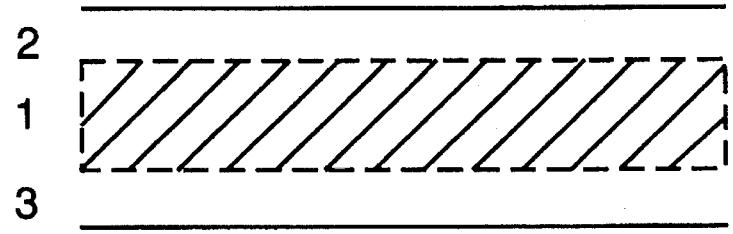

In FIG. 10, layer 1 is a paperboard substrate. An interior coating 2 and an exterior coating 3 are each present at a thickness of from about 0.5 to about 2.0 mil.

Figure 11:
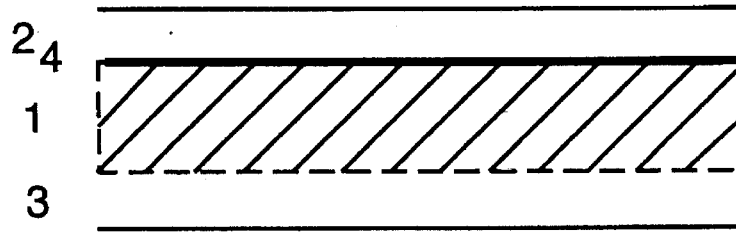
Figure 12:
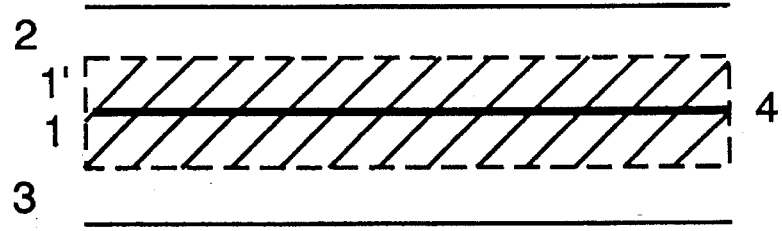

When it is desirable to minimize the rate of water vapor transmission, the coated paperboard illustrated in FIG. 11 or 12 can be employed. In FIG. 11, a layer 4 comprising a barrier layer, for example a high polyethylene content (30–100%) layer is coated directly onto one side of the paperboard. This coating is less than 0.5 mil. in thickness and preferably about 0.2–0.3 mil.

In one preferred embodiment, coatings 2 and 3 are comprised of at least 70% and preferably 90–100% of aliphatic polyester at a thickness of from about 0.5 to about 2 mils each. In addition to meeting all of the requirements described in (a)–(f) above, this embodiment provides an excellent barrier to moisture vapor. The polyethylene component which represents only about 1–3% by weight of the total composition does not interfere with the rate of composting as it is confined to the innermost layer and therefore does not hinder the degradation of the outermost layers, i.e.: the aliphatic polyester or the cellulose pulp fibers. Thus, in this embodiment of the invention, the outer surfaces 2 and 3, which provide the initial sites for microbial attack, are composed of the biodegradable aliphatic polyester coatings. The pulp substrate 1 is accessible to microbial attack either through the degraded layer 3 or through the edges.

In another alternative, the exterior coating layer 3 may be eliminated in which case exposure of the pulp layer is immediate and direct.

FIG. 12 represents an alternate configuration to the performance properties and compostability of FIG. 10. In this particular case, the high barrier layer 4 is positioned between two layers of pulp substrate 1 and 1'.

The container according to the present invention can be used to contain a variety of liquids and liquid containing materials. For Example, the container may be used for beverages such as milk, juice, fruit punch, soda, frozen juice, and iced tea; fabric softener; butter; margarine; cosmetics such as shampoo, conditioner, suntan lotion and body lotion; pancake syrup; cooking oil; processed grains, fruits and vegetables such as applesauce and pasta sauces; frozen vegetables; fruits; breads and bread products and single-use wet wipes.

In one embodiment, the container which is preferable for use with the present invention has cut ends which are sealed to avoid seepage of the liquid into or out of the body of the paperboard. The sealing of the edges may be done in a variety of manners. It may be accomplished by coating the edges, or by thinning the material down near the cut edges, i.e., skivving. Skivving of the edges is followed by folding the skivved areas over the cut edges.

In another preferred embodiment, there is a moisture-impervious membrane provided over the contents. Such membranes are sometimes referred to as lidding stock or material. Membranes for this application are typically comprised of a strong barrier top layer with a heat sealable lower layer. Non-limiting examples of top layers which may be used in the present invention, include paper, polyester, polyethylene, metallized polyester and polypropylene. Non-limiting examples of heat seal layers include polyethylene, ethylene-vinylacetate copolymers, and aliphatic polyester. The edges of the membrane are adhered to the upper edges of the container and provide an effective storage and shipping seal. The membrane should peel away from the edges of the container at the seal without exposure of pulp fibers. Additionally a moisture-impervious membrane can be heat sealed at the bottom of the container as well. The bottom of the container is preferably heat sealed by applying heat and pressure, as well known in the art.

In one embodiment when the material to be contained is wet towellettes, the consumer obtains the product, rips open a perforation providing a slot or opening in the paperboard, permitting the hinged cap-like lid to be raised. This exposes the membrane, which is easily peeled off with the fingers and either stored in the box or thrown away. Thereafter, sealing is done entirely by the raising and lowering of the hinged lid. The moist towels or napkins are preferably stacked and lie horizontally in the container and may be individually removed as needed.

It is also possible to provide a separate or separable pouch, bag or liner within the container to provide further waterproofing protection. Alternatively, this separable liner may be supplied during refilling of the container using a prepackaged bag of replacement wipes.

The container according to the present invention provides sufficient stiffness to provide the consumer with a container having handleability and to provide crush resistance of the box during storage, shipment and under conditions of household use.

Containers according to the present invention preferably have a compression strength of at least 60 lbs. and more preferably at least 70 lbs. as tested in accordance with *TAPPI* test procedure T-804. The container should also preferably have a cross directional Ring Crush of at least 115 lbs. and more preferably at least 140 lbs. Ring crush can be defined according to *TAPPI* Test Procedure T818 om-87. The compression strength of the containers is indicative of stacking and handling ability of the containers. Higher stiffness and crush resistance in the cross direction of the paperboard provides improved stacking and handling of the containers.

The following examples are illustrative of the invention embodied herein.

EXAMPLES

I. Paper used as base:
a. Bleached paperboard grade DLC (Schoeller Technical Papers, Pulaski, N.Y.); basis weight 175 lb/ream, 11.5 mils in thickness. Taber Stiffness MD (machine direction)×CD (cross direction)=65×35.
b. Bleached paperboard grade 4554 (Westvaco); basis weight 205 lb/ream; 20 mil in thickness.
c. Bleached paperboard grade GAA-11 (Schoeller) 3.5 mil., 38 lb/ream.
d. Bleached paperboard 215 lb/ream, International Paper.

II. The coatings were extruded from the following polymers:
a. polycaprolactone (PCL) Tone Polymers P-767E and P-787 (representing different molecular weights with 767E being the lowest), Union Carbide Chemicals and Plastics Company, Inc., Solvents and Coatings Materials Division, Bound Book, N.J.
b. PHBV tm (ICI Americas, Wilmington, Del.)—8% and 12% polyhydroxyvalerate;
c. Linear low density polyethylene (LLDPE); hexene based grade DFDA-7047 (Union Carbide)
d. Low density polyethylene (LDPE) (Quantum)

III. Testing and Evaluations a. Liquid containment was evaluated by the Mason Jar Test as follows:

The Mason Jar Test to Determine Liquid Containment of Packaging Materials

This test procedure provides a convenient way to observe the liquid barrier properties of film, paper, coated paper and related packaging materials. Failure in the test materials such as attack or penetration by the contained liquid or leaks through pin-holes and other coating imperfections are usually observed within the first 24 hours of the test.

Figure 13:
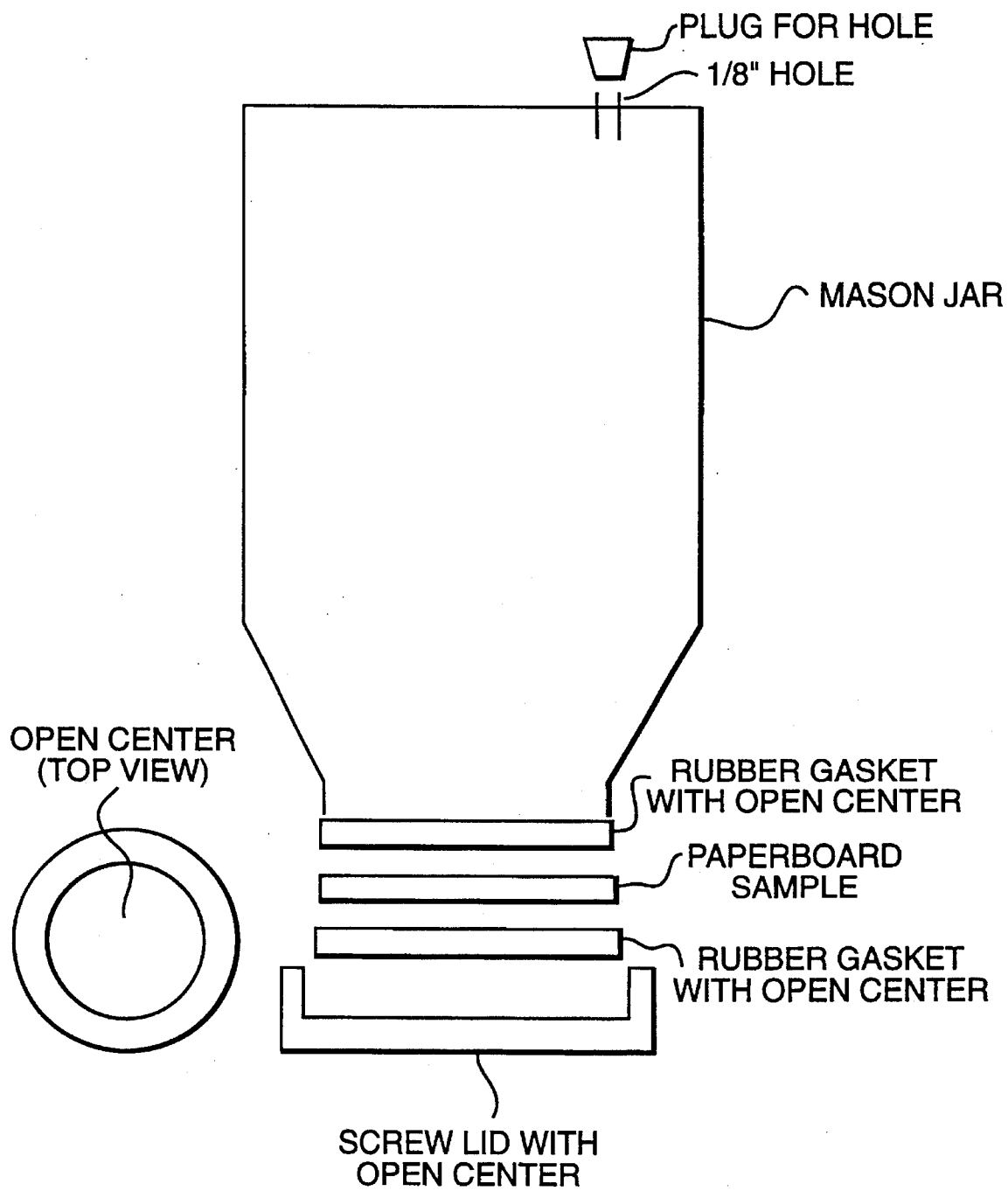
FIG. 13, illustrates the apparatus for use in the test methodology employed in the examples.

As can be seen from FIG. 13, a standard wide mouth Ball type Mason Jar, 7 inch high and 3½ inch wide is drilled with a ⅛" hole for pressure equalization.

The hole is plugged and the jar is filled with 600 ml of liquid. Optionally, dye may be added to aid in observing the nature and location of failures.

Test specimen circles 3 and 5/16" in diameter are placed between two rubber gaskets and then tightened on the jar with the outer screw type lid supplied with the jar.

The jar is inverted and the plug removed.

The assembly is examined daily for signs of leakage and penetration.

In those cases where fluid consistently leaked around specimen edges, it was useful to heat seal the material to the rubber gaskets.

Test results are reported based upon sample composition, thickness, liquid, elapsed time and nature of failure.

b. Water vapor transmission (WVT) was measured according to TAPPI T523 on -87 and ASTM F 1249-90 c. Oxygen transmission was measured according to ASTM D-3985

Extrusion coatings were conducted using an Egan single flight screw through a 15 inch T-type die with a 30 mil gap setting.

Polycaprolactone P-767E was extruded with a temperature profile of 200° F. in the feed zone; 225°–250° F. in the barrel and 245° F. in the die.

Films were collected on a matte finished steel chill roll at 55°–60° F. and combined through a nip roll with the substrate after surface treatment of the latter with corona discharge or flame to enhance adhesion.

EXAMPLE 1

PCL-767E was coated on one side of the Westvaco paperboard at a thickness of 1.25 mils. The coated material was challenged with baby wet wipe lotion in the Mason Jar Test with no signs of penetration or leakage after one month. Its water vapor transmission rate was 15.65 gm/100 sq.in./24 hr.

EXAMPLE 2

The coated paperboard from Example 1 was coated on the other side with a second layer of PCL-767E at 1.25 mil.

The coated board basis weight was 311.5 g/sq.m. with a thickness of 23 mils.

In the Mason Jar Test, using Downy® Fabric Softener, manufactured by Proctor & Gamble, as the fluid, no leaks, swelling or penetration was observed after 1.3 months. Similar results were observed with iced tea over a period of 26 days. Water vapor transmission was 8.55 gm/100 sq.in./24 hr.

EXAMPLE 3

PHBV 8% and 12% were mixed in a 1:1 ratio and extruded on the DLC substrate at a thickness of 1.5 mil. The basis weight of the coated paper was 215.8 g/sq.m.

In the Mason Jar Test, this material resisted leakage penetration by baby wet wipe lotion for two months.

EXAMPLE 4

The coating mix of Example 3 was applied to one side of the DLC substrate at a thickness of 2.0 mil. Total basis weight was 241.8 g/sq.m. The water vapor transmission value was 4.5 gm/100 sq.in./24 hr.

EXAMPLE 5

Polycaprolactone P-767E and LLDPE resin were mixed in a ratio of 90% PCL and 10% LLDPE and extruded onto the Westvaco paperboard at a coating thickness of from about 1.0 to about 1.3 mil.

Extrusion temperatures were 275° F. at the feed zone 325°–345° F. in the barrel; and 345° F. in the die.

Basis weight was 291.5 g/sq.m. Water vapor transmission was 11.0 gm/sq.in./24 hr. In comparison to Experiment 1, water vapor transmission was reduced by 30% due to the presence of the polyethylene.

EXAMPLE 6

In this experiment a second coating layer was applied to the product of Example 5. Coating thickness was 1.25 mil. and the basis weight measured at 303.9 g/sq.m. Water vapor transmission was 5.33 gm/100 sq.in./24 hrs. In comparison to Experiment 2, water vapor transmission was reduced by 38% due to the presence of polyethylene.

In the Mason Jar Test with baby wet wipe lotion, no leaks or penetration was observed for five weeks.

EXAMPLE 7

PCL-767E and LLDPE were mixed in a ratio of 85/15 and extruded onto the Westvaco paper at a thickness of 1.25 mil. Water vapor transmission was 8.45 gm/100 sq.in./24 hr. In comparison to Experiment 1, water vapor transmission was reduced by 46% due to the polyethylene.

Downey fabric softener was used in the Mason Jar Test with no leaks or penetration after one month.

EXAMPLE 8

A second layer of 85/15 PCL-767E and LLDPE at 1.25 mil. was applied to the other side of the substrate used in Experiment 7 giving a total basis weight of 300.7 g/sq.m.

Water vapor transmission was 4.81 gm/100 sq.m./24 hr. In the Mason Jar Test with baby wet wipe lotion, no leaks or penetration was observed for three weeks. In comparison with Experiment 2, water vapor transmission was reduced by 44% due to the presence of polyethylene.

Example 1–8 above illustrate the configurations as set forth in FIGS. 9 and 10.

EXAMPLE 9

With DLC as the substrate an 5.5 mil. coating of low density polyethylene (Quantum NA-206) was extruded on one side only.

Two layers of PCL 767E at 1.2 mil. each were then extruded onto first, the polyethylene side and second, the uncoated side. This composite is representative of the embodiment described in FIG. 10. The water vapor transmission rate was 1.22 gm/100 in$^2$/24 hr.

EXAMPLE 10

Example 9 was repeated with a polyethylene coating of 0.3 mil. The water vapor transmission rate was 1.79 gm/100 in$^2$/24 hr. Taber Stiffness according to TAPPI-489 was 98.5 in the machine-direction and 60.0 in the cross direction.

EXAMPLE 11

This is an example of the configuration shown in FIG. 8. The substrate, GAA-11, was a high tear strength, starch sized paper at 3.5 mil. thickness. It was extrusion coated with 2.0 mil. of PCL-767E giving a material useful as a heat sealable lidding stock.

The following examples illustrate test samples which were deemed to provide acceptable barrier properties and degradation properties for use in the present invention.

EXAMPLE 12

2.0 mils of 85% PCL and 15% LLDPE was coated on both sides of a base of 215 lb/ream paperboard obtained from International Paper.

EXAMPLE 13

1.25 mils of 85% PCL and 15% LLDPE was coated on both sides of a base of 215 lb/ream paperboard obtained from International Paper.

EXAMPLE 14

2.0 mils of 90% PCL and 10% LLDPE was coated on both sides of a base of 215 lb/ream paperboard obtained from International Paper.

EXAMPLE 15

1.25 mils of 90% PCL and 10% LLDPE was coated on both sides of a base of 215 lb/ream paperboard obtained from International Paper.

EXAMPLE 16

First 0.5 mils of LDPE and then 1.25 mils of PCL were coated on one side of a base of 215 lb/ream paperboard obtained from International Paper. The other side of the based was coated with 2.0 mils of PCL.

EXAMPLE 17

0.5 mils of LDPE, 85% PCL and 15% Texin 480A polyurethane was coated on both sides of a base of 215 lb/ream paperboard obtained from International Paper.

The oxygen permeability of these and other coatings on paperboard are compared in the chart below (23° C.):

| COATING SAMPLE | CC O$_2$/100 IN$_2$/24 HOUR | |
|---|---|---|
| | 760 mm O$_2$ | 0 mm O$_2$ |
| Low density polyethylene; reference Example 3 Serial No. 07/923,556 | 21.8 (80% RH) 22.2 (30% RH) | 17.2 (80% RH) 17.3 (30% RH) |
| Example 2 Present Invention | 13.8 (80% RH) 13.8 (30% RH) | 12.6 (80% RH) 12.4 (30% RH) |
| Example 6 | 29.0 (80% RH) | 16.5 (80% RH) |
| Example 8 | 33.0 (30% RH) 26.0 (80% RH) 30.4 (30% RH) | 43.0 (30% RH) 15.4 (80%) 28.5 (30% RH) |

The coated paper board materials described in the examples above are excellent candidates in the construction of containers for the packaging of liquids and wet products.

Ease of sealing and seal integrity were excellent, and surprisingly better than polyethylene which is the current industry standard. When exposed to hot air for 5–10 seconds, these coatings became tacky and readily formed strong coating to coating or coating to paper bonds. The present invention also provides for means by which the adhesive-properties of the coated surface may be modified. For examples, in the opening and dispensing of a heat sealed container, the adhesion may be desirably reduced to allow a clean, fiber-free peel and separation of layers.

These and related modifications may be achieved by blending or by topical treatment of the coatings described herein with low molecular weight, (i.e., 500–3000) aliphatic polyesters. The later have a tendency to be waxy and low in strength; and, as such, weaken the adhesive interface and lower the cohesive strength of the coating.

Materials of this invention are well suited to the steps involved in converting coated paperboard into a folded carton including sheeting, printing, scoring, perforating, skivving, folding, and sealing.

The result of the Mason Jar Tests with typical fluids indicate that aliphatic polyesters in film form when coated on paper substrates are entirely satisfactory in containing a wide range of liquids.

Other embodiments of the invention will be invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A compostable container for packaging a liquid or liquid containing material comprising:

a base of paperboard having an exterior surface and an interior surface wherein at least said interior surface is treated with corona discharge or a flame;

a coating of an aliphatic polyester disposed on at least said interior surface at a thickness of from about 5.5 mil to about 2.0 mils;

wherein at least said treated interior surface and said coating define a water insensitive inter-facial bond free of adhesive;

wherein said base and said polyester are capable of degrading at substantially the same rate to form carbon dioxide, water, and biomass; and wherein said base has a cross-directional Taber stiffness of 50 to 150 , a thickness of from about 4 to 25 mils, and a basis weight of from about 35 to about 220 lbs/ream.

2. The container according to claim 1, wherein said polyester is heat sealable, flexible, adhesive, resistance to stress cracks and abrasion resistant.

3. The container according to claim 1, wherein said aliphatic polyester is selected from the group consisting of polycaprolactone, a polyester of 3-hydroxybutyric acid, a polyester of 3-hydroxyvaleric acid, polyglycolic acid, polylactic acid, and copolymers and mixtures thereof.

4. The container according to claim 3, wherein said polyester is polycaprolactone.

5. The container according to claim 1 wherein said aliphatic polyester contains a blending polymer selected from the group consisting of PVC, SAN, ABS, phenoxy, polycarbonate, nitrocellulose, poly vinylidene chloride, styrene/allyl alcohol copolymers, polyethylene, polypropylene, natural rubber, styrene/butadiene elastomer and block copolymers, polyvinylacetate, polybutadiene, ethylene/propylene rubber, starch and thermoplastic segmented polyurethane.

6. The container according to claim 5, wherein the blending polymer is polyethylene.

7. The container according to claim 1, wherein said base further comprises, two layers of paperboard having a barrier layer placed therebetween.

8. The container according to claim 7, wherein the barrier layer is polyethylene.

9. The container according to claim 1, wherein said base of paperboard has a barrier layer applied prior to application of said polyester.

10. The container according to claim 9, wherein the barrier layer is polyethylene.

11. A compostable package having a liquid or liquid containing material therein comprising:

a base of paperboard forming a container having an exterior surface and an interior surface wherein at least said interior surface is treated with corona discharge or a flame;

a coating of an aliphatic polyester disposed on at least said interior surface at a thickness of from 5.5 mil to about 2.0 mils;

wherein at least said treated interior surface and said coating define a water insensitive inter-facial bond free of adhesive;

wherein said base and said polyester are capable of degrading at substantially the same rate to form carbon dioxide water and biomass;

wherein said base has a cross-directional Taber stiffness of 50 to 150, a thickness of from about 4 to 25 mils, and a basis weight of from about 35 to about 220 lbs/ream, and wherein said container has therein, a liquid or liquid containing material.

12. The container according to claim 11, wherein said polyester is selected from polyhydroxyaliphatic acids.

13. The container according to claim 11, wherein said aliphatic polyester is selected from the group consisting of polycaprolactone, a polyester of 3-hydroxybutric acid, a polyester of 3-hydroxyvaleric acid, polyglycolic acid, polylactic acid, and copolymers and mixtures thereof.

14. The container according to claim 13, wherein said polyester is polycaprolactone.

15. The container according to claim 11, wherein said polyester further contains an additive selected from the group consisting of PVC, SAN, ABS, phenyoxy, polycarbonate, nitrocellulose, poly vinylidene chloride, styrene/allyl alcohol copolymers, polyethylene, polypropylene, natural rubber, styrene/polybutadiene, ethylene/propylene rubber and starch.

16. The container according to claim 15, wherein the additive is polyethylene.

17. The container according to claim 11, wherein the liquid or liquid containing material is selected from the group consisting of milk, juice, fruit punch, soda, frozen juice, iced tea, fabric softener, butter, margarine, cosmetics, shampoo, conditioner, suntan lotion, body lotion, pancake syrup, cooking oil, processed grains, fruits, vegetables, applesauce pasta sauces, frozen vegetables, frozen fruits, breads, bread products and single-use wet wipes.

18. The container according to claim 17, wherein the liquid or liquid containing material is single-use wet wipes.

19. The container according to claim 11, wherein said base further comprises, two layers of paperboard having a barrier layer placed therebetween.

20. The container according to claim 19, wherein the barrier layer is polyethylene.

21. The container according to claim 11, wherein said base of paperboard has a barrier layer applied prior to application of said polyester.

22. The container according to claim 21 wherein the barrier layer is polyethylene.

* * * * *

UNITED STATES PATENT AND TRADEMARK OFFICE
CERTIFICATE OF CORRECTION

PATENT NO. : 5,458,933
DATED : October 17, 1995
INVENTOR(S) : Stuart P. Suskind

It is certified that error appears in the above-indentified patent and that said Letters Patent is hereby corrected as shown below:

Claim 1, col. 12, line 51, "5.5" should read --0.5--.

Claim 11, col. 13, line 34, "5.5" should read --0.5--.

Column 4, lines 15 and and 17, "5.5" should read --0.5--.

Signed and Sealed this

Twenty-fourth Day of December, 1996

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,458,933
DATED : October 17, 1995
INVENTOR(S) : Stuart P. SUSKIND

It is certified that error appears in the above-indentified patent and that said Letters Patent is hereby corrected as shown below:

Claim 2, column 12, line 64, "resistance" should read --resistant--.

Claim 17, column 14, line 29, "applesauce pasta sauces," should read --applesauce, pasta sauces,--.

Signed and Sealed this

Twenty-fifth Day of February, 1997

Attest:

BRUCE LEHMAN

*Attesting Officer*  *Commissioner of Patents and Trademarks*